US011027430B2

(12) United States Patent
Thackston et al.

(10) Patent No.: US 11,027,430 B2
(45) Date of Patent: Jun. 8, 2021

(54) SYSTEMS AND METHODS FOR LATENCY COMPENSATION IN ROBOTIC TELEOPERATION

(71) Applicant: Toyota Research Institute, Inc., Los Altos, CA (US)

(72) Inventors: Allison Thackston, San Jose, CA (US); Sam Zapolsky, San Francisco, CA (US); Katarina Bouma, Palo Alto, CA (US); Laura Stelzner, Mountain View, CA (US); Ron Goldman, Los Altos, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 364 days.

(21) Appl. No.: 16/159,218

(22) Filed: Oct. 12, 2018

(65) Prior Publication Data

US 2020/0114513 A1    Apr. 16, 2020

(51) Int. Cl.
    *B25J 9/16*    (2006.01)

(52) U.S. Cl.
    CPC ............. *B25J 9/1689* (2013.01); *B25J 9/163* (2013.01); *B25J 9/1664* (2013.01); *B25J 9/1697* (2013.01)

(58) Field of Classification Search
    CPC ....................................................... B25J 9/16
    See application file for complete search history.

(56) References Cited

U.S. PATENT DOCUMENTS

| 5,086,400 | A  | * | 2/1992  | Hayati ............... B25J 9/1689 |
|           |    |   |         | 700/260 |
| 7,626,569 | B2 | * | 12/2009 | Lanier ................ G06F 1/1601 |
|           |    |   |         | 345/156 |
| 9,144,907 | B2 |   | 9/2015  | Summer et al. |
| 9,399,294 | B1 |   | 7/2016  | Hickman et al. |
| 9,501,946 | B1 | * | 11/2016 | Kulkarni ............. G06F 3/0346 |
| 9,519,286 | B2 |   | 12/2016 | Lacaze et al. |
| 9,623,561 | B2 |   | 4/2017  | Stephens, Jr. |

(Continued)

FOREIGN PATENT DOCUMENTS

| CN | 102880063 B | 1/2016 |
| CN | 103302668 B | 3/2016 |

(Continued)

OTHER PUBLICATIONS

Mitchell J.H. Lum et al "Teleoperation in surgical robotics-Network latency effects on surgical performance"; 5 pages (Year: 2009).*

(Continued)

*Primary Examiner* — Kira Nguyen
(74) *Attorney, Agent, or Firm* — Dinsmore & Shohl LLP

(57) ABSTRACT

A method includes presenting a virtual representation of an environment of a robot, receiving a first user command to control the robot within the environment, rendering a predicted version of the virtual representation during a period of latency in which current data pertaining to the environment of the robot is not available, updating the predicted version of the virtual representation based upon a second user command received during the period of latency, and upon conclusion of the period of latency, reconciling the predicted version of the virtual representation with current data pertaining to the environment of the robot.

17 Claims, 12 Drawing Sheets

(56) References Cited

U.S. PATENT DOCUMENTS

| | | | |
|---|---|---|---|
| 9,776,325 B1 | 10/2017 | Hoffmann et al. | |
| 2011/0087371 A1* | 4/2011 | Sandberg | G05D 1/0038 |
| | | | 700/245 |
| 2011/0306986 A1 | 12/2011 | Lee et al. | |
| 2015/0304193 A1* | 10/2015 | Ishii | H04L 43/10 |
| | | | 709/224 |
| 2016/0120048 A1* | 4/2016 | Seo | A61B 5/6843 |
| | | | 600/301 |
| 2016/0226344 A1* | 8/2016 | Matsuda | B60K 1/00 |
| 2020/0306974 A1* | 10/2020 | Fattey | B25J 9/1689 |

FOREIGN PATENT DOCUMENTS

| | | |
|---|---|---|
| CN | 104460670 B | 2/2017 |
| KR | 10-0316630 B1 | 12/2001 |

OTHER PUBLICATIONS

A.K. Bejczy et al., "The phantom robot: predictive displays for teleoperation with time delay", Proceedings., IEEE International Conference on Robotics and Automation, May 13-18, 1990, Cincinnati, OH, DOI: 10.1109/ROBOT.1990.126037, https://ieeexplore.ieee.org/document/126037/ (3 pages total).

Mark J. Brudnak, Ph.D., "Predictive Displays for High Latency Teleoperation", Proceedings of the 2016 NDIA Ground Vehicle Systems Engineering and Technology Symposium (GVSETS), Modeling & Simulation, Testing and Validation (MSTV) Technical Session, Aug. 2-4, 2016, Novi, Michigan, www.dtic.mil/get-tr-doc/pdf?AD=AD1036015 (16 pages total).

* cited by examiner

SYSTEMS AND METHODS FOR LATENCY COMPENSATION IN ROBOTIC TELEOPERATION

TECHNICAL FIELD

The present application generally relates to telematic robot control and, more particularly, compensation for latency encountered during teleoperation of a robot.

BACKGROUND

Users may teleoperatively control remote robots to perform a variety of tasks. The remote nature of such teleoperative remote control can introduce latency in the connection between the user and the robot. For example, network congestion can produce lag in what the user sees as compared to what is occurring in the robot's environment. This may result in the user losing awareness of the state of the robot as well as being unable to provide input to control the robot during the latency. This in turn may result in undesirable and unintended interactions between the robot and its environment.

Accordingly, a need exists to improve teleoperative user interfaces during periods of latency.

SUMMARY

A method includes presenting a virtual representation of an environment of a robot, receiving a first user command to control the robot within the environment, rendering a predicted version of the virtual representation during a period of latency in which current data pertaining to the environment of the robot is not available, updating the predicted version of the virtual representation based upon a second user command received during the period of latency, and upon conclusion of the period of latency, reconciling the predicted version of the virtual representation with current data pertaining to the environment of the robot.

In another embodiment, an interface device includes memory and a processor coupled to the memory. The processor is configured to present a virtual representation of an environment of a robot, receive a first user command to control the robot within the environment, render a predicted version of the virtual representation during a period of latency in which current data pertaining to the environment of the robot is not available, update the predicted version of the virtual representation based upon a second user command received during the period of latency, and, upon conclusion of the period of latency, reconcile the predicted version of the virtual representation with current data pertaining to the environment of the robot.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to a user teleoperating a robot. More specifically, the robot may need to be operated during periods of latency, such that user input may be needed even while the user does not have a current view of the robot's environment. For example, the robot's environment can be simulated/predicted based upon user input received during periods of latency, such as where the robot is provided a command prior to latency. In this way, the environment can be predicted during the latency as if the robot had actually executed the command. This means that a predicted version of the robot's environment can be presented in a way that is responsive to the user's input during the latency. Various embodiments of latency compensation for teleoperated robots are described in detail below.

Figure 1:
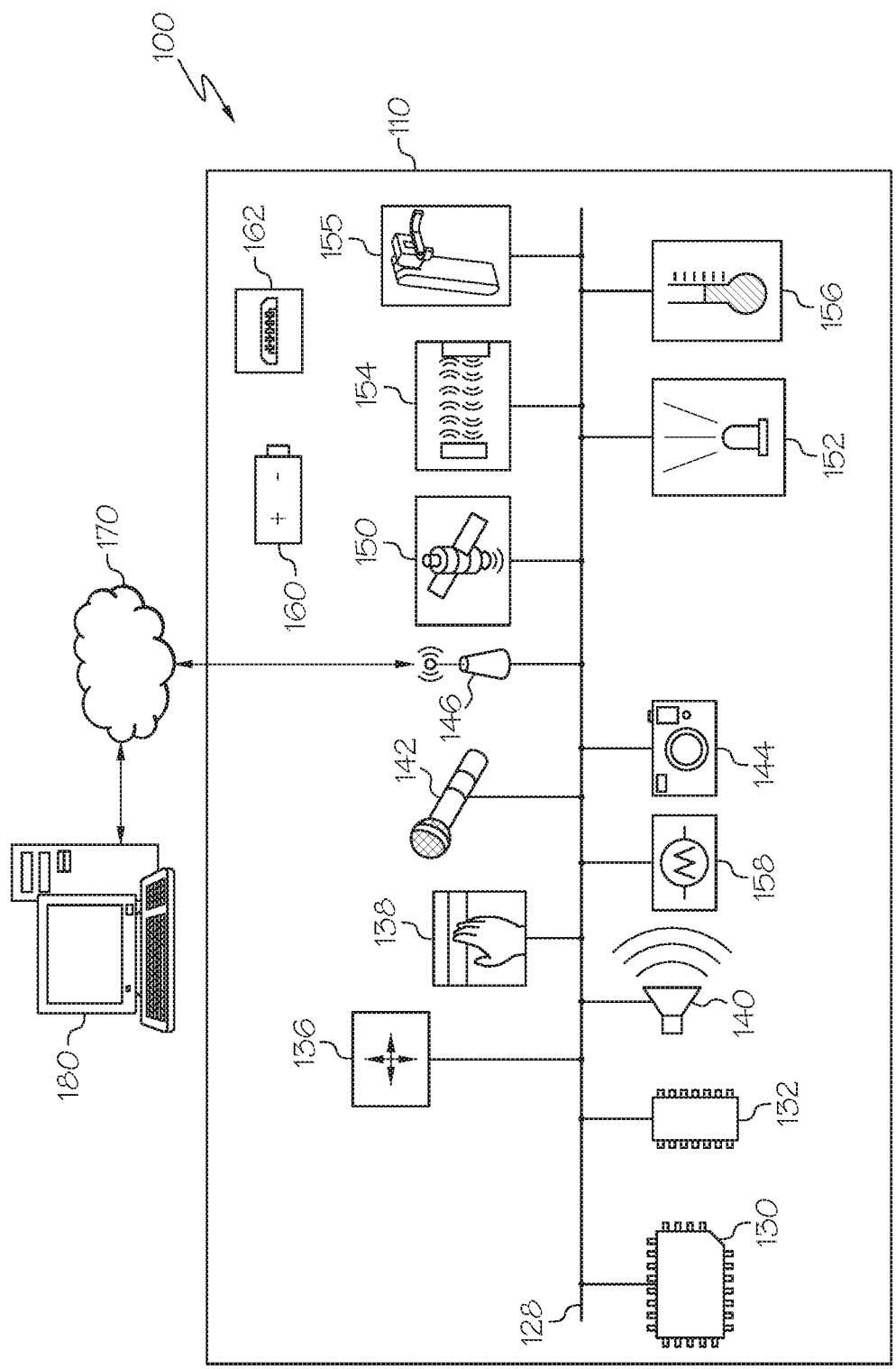
FIG. 1 is a block diagram illustrating hardware utilized in one or more robots for implementing various processes, media, and systems, according to one or more embodiments shown and described herein.

Referring now to FIG. 1, example components of one embodiment of a robot 100 are schematically depicted. The robot 100 includes a housing 110, a communication path 128, a processor 130, a memory module 132, an inertial measurement unit 136, an input device 138, an audio output device 140 (e.g., a speaker), a microphone 142, a camera 144, network interface hardware 146, a location sensor 150, a light 152, a proximity sensor 154, one or more arms 155, a temperature sensor 156, a mobility actuator 158, a battery 160, and a charging port 162. The components of the robot 100 other than the housing 110 may be contained within or mounted to the housing 110. The various components of the robot 100 and the interaction thereof will be described in detail below.

Still referring to FIG. 1, the communication path 128 may be formed from any medium that is capable of transmitting a signal such as, for example, conductive wires, conductive traces, optical waveguides, or the like. Moreover, the communication path 128 may be formed from a combination of mediums capable of transmitting signals. In one embodiment, the communication path 128 comprises a combination of conductive traces, conductive wires, connectors, and buses that cooperate to permit the transmission of electrical data signals to components such as processors, memories, sensors, input devices, output devices, and communication devices. Accordingly, the communication path 128 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 128 communicatively couples the various components of the robot 100. As used herein, the term "communicatively coupled" means that coupled components are capable of exchanging data signals with one another such as, for example, electrical signals via conductive medium, electromagnetic signals via air, optical signals via optical waveguides, and the like.

The processor 130 of the robot 100 may be any device capable of executing machine-readable instructions. Accordingly, the processor 130 may be a controller, an integrated circuit, a microchip, a computer, or any other computing device. The processor 130 is communicatively coupled to the other components of the robot 100 by the communication path 128. Accordingly, the communication path 128 may communicatively couple any number of processors with one another, and allow the components coupled to the communication path 128 to operate in a distributed computing environment. Specifically, each of the components may operate as a node that may send and/or receive data. While the embodiment depicted in FIG. 1 includes a single processor 130, other embodiments may include more than one processor.

Still referring to FIG. 1, the memory module 132 of the robot 100 is coupled to the communication path 128 and communicatively coupled to the processor 130. The memory module 132 may comprise RAM, ROM, flash memories, hard drives, or any non-transitory memory device capable of storing machine-readable instructions such that the machine-readable instructions can be accessed and executed by the processor 130. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 132. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single memory module 132, other embodiments may include more than one memory module.

The inertial measurement unit 136, if provided, is coupled to the communication path 128 and communicatively coupled to the processor 130. The inertial measurement unit 136 may include one or more accelerometers and one or more gyroscopes. The inertial measurement unit 136 transforms sensed physical movement of the robot 100 into a signal indicative of an orientation, a rotation, a velocity, or an acceleration of the robot 100. The operation of the robot 100 may depend on an orientation of the robot 100 (e.g., whether the robot 100 is horizontal, tilted, and the like). Some embodiments of the robot 100 may not include the inertial measurement unit 136, such as embodiments that include an accelerometer but not a gyroscope, embodiments that include a gyroscope but not an accelerometer, or embodiments that include neither an accelerometer nor a gyroscope.

Still referring to FIG. 1, one or more input devices 138 are coupled to the communication path 128 and communicatively coupled to the processor 130. The input device 138 may be any device capable of transforming user contact into a data signal that can be transmitted over the communication path 128 such as, for example, a button, a switch, a knob, a microphone or the like. In some embodiments, the input device 138 includes a power button, a volume button, an activation button, a scroll button, or the like. The one or more input devices 138 may be provided so that the user may interact with the robot 100, such as to navigate menus, make selections, set preferences, and other functionality described herein. In some embodiments, the input device 138 includes a pressure sensor, a touch-sensitive region, a pressure strip, or the like. It should be understood that some embodiments may not include the input device 138. As described in more detail below, embodiments of the robot 100 may include multiple input devices disposed on any surface of the housing 110. In some embodiments, an input device 138 may include force sensors to detect an amount of force being exerted by and/or upon the robot 100 and/or tactile sensors to provide a sense of touch.

The speaker 140 (i.e., an audio output device) is coupled to the communication path 128 and communicatively coupled to the processor 130. The speaker 140 transforms audio message data from the processor 130 of the robot 100 into mechanical vibrations producing sound. For example, the speaker 140 may provide to the user navigational menu information, setting information, status information, information regarding the environment as detected by image data from the one or more cameras 144, and the like. However, it should be understood that, in other embodiments, the robot 100 may not include the speaker 140.

The microphone 142 is coupled to the communication path 128 and communicatively coupled to the processor 130.

The microphone 142 may be any device capable of transforming a mechanical vibration associated with sound into an electrical signal indicative of the sound. The microphone 142 may be used as an input device 138 to perform tasks, such as navigate menus, input settings and parameters, and any other tasks. It should be understood that some embodiments may not include the microphone 142.

Still referring to FIG. 1, the camera 144 is coupled to the communication path 128 and communicatively coupled to the processor 130. The camera 144 may be any device having an array of sensing devices (e.g., pixels) capable of detecting radiation in an ultraviolet wavelength band, a visible light wavelength band, or an infrared wavelength band. The camera 144 may have any resolution. The camera 144 may be an omni-directional camera, or a panoramic camera. In some embodiments, one or more optical components, such as a mirror, fish-eye lens, or any other type of lens may be optically coupled to the camera 144.

The network interface hardware 146 is coupled to the communication path 128 and communicatively coupled to the processor 130. The network interface hardware 146 may be any device capable of transmitting and/or receiving data via a network 170. Accordingly, network interface hardware 146 can include a wireless communication module configured as a communication transceiver for sending and/or receiving any wired or wireless communication. For example, the network interface hardware 146 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 146 includes hardware configured to operate in accordance with the Bluetooth wireless communication protocol. In another embodiment, network interface hardware 146 may include a Bluetooth send/receive module for sending and receiving Bluetooth communications to/from an interface device 180. The network interface hardware 146 may also include a radio frequency identification ("RFID") reader configured to interrogate and read RFID tags.

In some embodiments, the robot 100 may be communicatively coupled to an interface device 180 via the network 170. In some embodiments, the network 170 is a personal area network that utilizes Bluetooth technology to communicatively couple the robot 100 and the interface device 180. In other embodiments, the network 170 may include one or more computer networks (e.g., a personal area network, a local area network, or a wide area network), cellular networks, satellite networks and/or a global positioning system and combinations thereof. Accordingly, the robot 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 1, as stated above, the network 170 may be utilized to communicatively couple the robot 100 with the interface device 180. As discussed in more detail below with respect to FIG. 3, the interface device 180 may include a tablet, mobile phone, a smartphone, a personal digital assistant, a camera, a dedicated mobile media player, a mobile personal computer, a wearable computing device (such as a headset for virtual reality or glasses for augmented reality), a desktop computer, a server, a laptop computer, an imaging device, and/or any other electronic device capable of being communicatively coupled with the robot 100. The interface device 180 may include one or more processors and one or more memories. The one or more processors can execute logic to communicate with the robot 100. The interface device 180 may be configured with wired and/or wireless communication functionality for communicating with the robot 100. In some embodiments, the interface device 180 may perform one or more elements of the functionality described herein, such as in embodiments in which the functionality described herein is distributed between the robot 100 and the interface device 180.

The location sensor 150 is coupled to the communication path 128 and communicatively coupled to the processor 130. The location sensor 150 may be any device capable of generating an output indicative of a location. In some embodiments, the location sensor 150 includes a global positioning system (GPS) sensor, though embodiments are not limited thereto. Some embodiments may not include the location sensor 150, such as embodiments in which the robot 100 does not determine a location of the robot 100 or embodiments in which the location is determined in other ways (e.g., based on information received from the camera 144, the microphone 142, the network interface hardware 146, the proximity sensor 154, the inertial measurement unit 136 or the like). The location sensor 150 may also be configured as a wireless signal sensor capable of triangulating a location of the robot 100 and the user by way of wireless signals received from one or more wireless signal antennas.

The mobility actuator 158 is coupled to the communication path 128 and communicatively coupled to the processor 130. As described in more detail below, the mobility actuator 158 may be or otherwise include a motorized wheel assembly that includes one or more motorized wheels that are driven by one or more motors. In other embodiments, the mobility actuator 158 may include one or more limbs (with or without joints) such as legs, arms, or anything else that may be utilized by the robot 100 for walking, crawling, swimming, self-pulling/dragging across a surface, etc. In some embodiments, limbs may include webbing or any suitable configuration and/or material that may utilized for travelling within and/or under water. In other embodiments the mobility actuator 158 may include sails, propellers, and/or turbines for underwater mobility. In still other embodiments, the mobility actuator 158 may include wings, propellers, and/or turbines for air travel/flight, which may include hovering.

The processor 130 may provide one or more drive signals to the mobility actuator 158 to, for example, actuate motorized wheels in a motorized wheel assembly such that the robot 100 travels to a desired location. This may be a location that the user wishes to acquire environmental information (e.g., the location of particular objects within at or near the desired location), or a location from which the robot 100 may manipulate an object as desired by the user.

Still referring to FIG. 1, the light 152 is coupled to the communication path 128 and communicatively coupled to the processor 130. The light 152 may be any device capable of outputting light, such as, but not limited to, a light emitting diode, an incandescent light, a fluorescent light, or the like. Some embodiments include a power indicator light that is illuminated when the robot 100 is powered on. Some embodiments include an activity indicator light that is illuminated when the robot 100 is active or processing data. Some embodiments include an illumination light for illuminating the environment in which the robot 100 is located. Some embodiments may not include the light 152.

The proximity sensor 154 is coupled to the communication path 128 and communicatively coupled to the processor 130. The proximity sensor 154 may be any device capable of outputting a proximity signal indicative of a proximity of the robot 100 to another object. In some embodiments, the proximity sensor 154 may include a laser scanner, a capacitive displacement sensor, a Doppler effect sensor, an eddy-current sensor, an ultrasonic sensor, a magnetic sensor, an optical sensor, a radar sensor, a lidar sensor, a sonar sensor, or the like. Some embodiments may not include the proximity sensor 154, such as embodiments in which the proximity of the robot 100 to an object is determine from inputs provided by other sensors (e.g., the camera 144, the speaker 140, etc.) or embodiments that do not determine a proximity of the robot 100 to an object. One or more arms 155 may be utilized and feature any number of joints, effectuators, and the like. One or more arms 155 may be utilized and feature any number of joints, effectuators, force sensors, tactile sensors, and the like.

The temperature sensor 156 is coupled to the communication path 128 and communicatively coupled to the processor 130. The temperature sensor 156 may be any device capable of outputting a temperature signal indicative of a temperature sensed by the temperature sensor 156. In some embodiments, the temperature sensor 156 may include a thermocouple, a resistive temperature device, an infrared sensor, a bimetallic device, a change of state sensor, a thermometer, a silicon diode sensor, or the like. Some embodiments of the robot 100 may not include the temperature sensor 156.

Still referring to FIG. 1, the robot 100 is powered by the battery 160, which is electrically coupled to the various electrical components of the robot 100. The battery 160 may be any device capable of storing electric energy for later use by the robot 100. In some embodiments, the battery 160 is a rechargeable battery, such as a lithium-ion battery or a nickel-cadmium battery. In embodiments in which the battery 160 is a rechargeable battery, the robot 100 may include the charging port 162, which may be used to charge the battery 160. Some embodiments may not include the battery 160, such as embodiments in which the robot 100 is powered the electrical grid, by solar energy, or by energy harvested from the environment. Some embodiments may not include the charging port 162, such as embodiments in which the apparatus utilizes disposable batteries for power.

Figure 2:
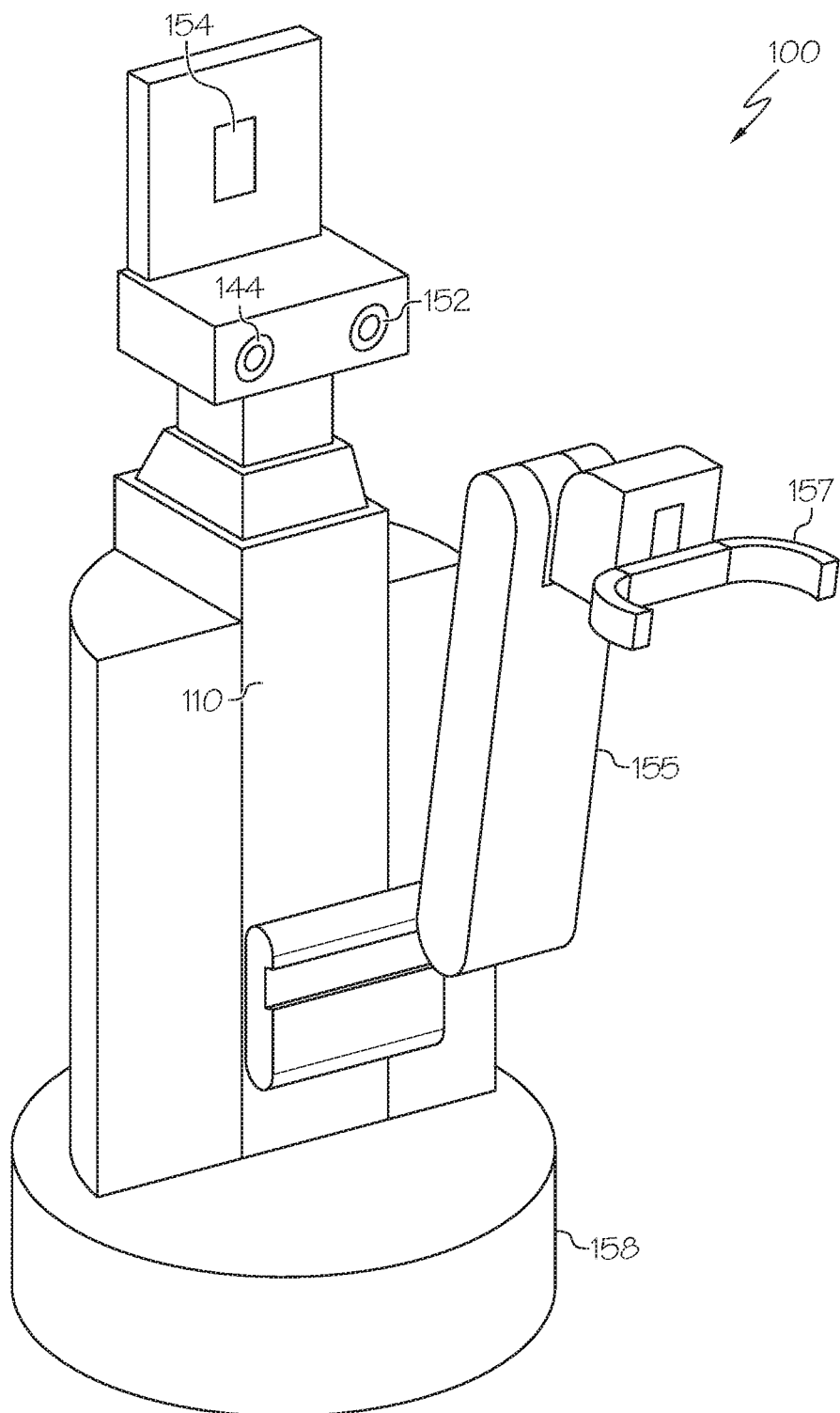
FIG. 2 schematically illustrates a top perspective view of an example robot according to one or more embodiments described and illustrated herein.

Referring now to FIG. 2, the physical configuration of the robot 100 is schematically illustrated. The robot 100 may be of any suitable size, height, weight, dimensions, etc. Generally, the robot 100 includes a housing 110, a camera 144, a light 152, and a base portion having a mobility actuator 158, which in this embodiment is a motorized wheel assembly. The robot 100 includes a proximity sensor 154 at a top portion of the robot 100 above the camera 144 and the light 152, though in other embodiments the proximity sensor 154 may be positioned at a different location. Any number of proximity sensors 154 may be provided. As described above with respect to FIG. 1, the proximity sensor 154 may generate one or more signals based on the presence of one or more objects. The proximity sensor(s) 154 may be used by the robot 100 to detect objects (e.g., anything with which the example robot 100 can interact) and/or avoid obstacles (e.g., people, furniture, stairs, walls, and the like) as it navigates within the environment, fully autonomously, partially autonomously, under user teleoperative control, or the like.

The robot 100 may feature one or more arms 155. In this embodiment, the arm 155 utilizes an interaction effectuator 157 to interact with objects, such as picking them up. Any suitable type of arm 155 may be utilized, and may feature any suitable number, configuration, and/or type of interaction effectuators 157. It should be understood that the arrangement of the components depicted in FIG. 2 is for illustrative purposes only, and that embodiments are not limited thereto. Portions of the robot 100 may be made of a material that is substantially transparent to the wavelength of the radiation detected by the camera 144 (e.g., wavelengths within the visual spectrum). Any suitable number of cameras may be utilized. In some embodiments, the camera 144 is configured to capture omni-directional image data. For example, the camera 144 may rotate about an axis to capture image data about three-hundred and sixty degrees surrounding the robot 100. Further, the camera 144 may be configured to automatically tilt up and down and/or pan left and right to capture additional image data that would otherwise be out of view if the camera 144 did not tilt up and down.

Figure 3:
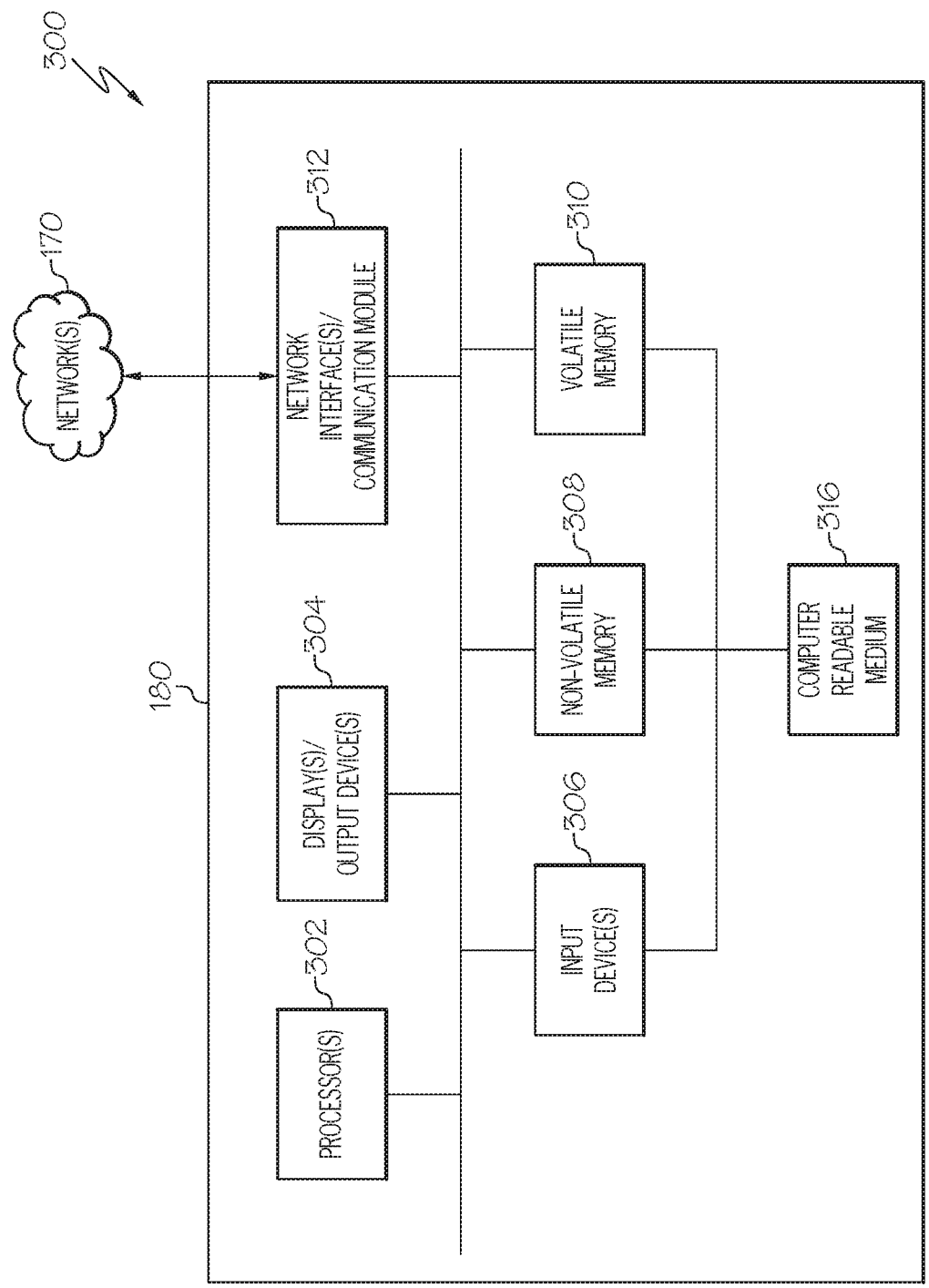
FIG. 3 is a block diagram illustrating computing hardware utilized in one or more devices for implementing various processes, media, and systems, according to one or more embodiments shown and described herein.

Turning to FIG. 3, a block diagram illustrates an exemplary computing environment 300 through which embodiments of the disclosure can be implemented, such as, for example, in the interface device 180 depicted in FIG. 1. The interface device 180 described herein is but one example of a suitable computing device and does not suggest any limitation on the scope of any embodiments presented. Nothing illustrated or described with respect to the interface device 180 should be interpreted as being required or as creating any type of dependency with respect to any element or plurality of elements. In various embodiments, an interface device 180 may include, but need not be limited to, a tablet, mobile phone, a smartphone, a personal digital assistant, a camera, a dedicated mobile media player, a mobile personal computer, a wearable computing device (such as a headset for virtual reality or glasses for augmented reality), a desktop computer, a server, a laptop computer, an imaging device, and/or any other electronic device capable of being communicatively coupled with the robot 100. An interface device 180 in some embodiments may include an interface component as well as a control device. In an embodiment, the interface device 180 includes at least one processor 302 and memory (non-volatile memory 308 and/or volatile memory 310). The interface device 180 may include non-volatile memory 308 (ROM, flash memory, etc.), volatile memory 310 (RAM, etc.), or a combination thereof. In some embodiments, the at least one processor 302 is coupled to the non-volatile memory 308 and/or volatile memory 310. The interface device 180 may utilize, by way of non-limiting example, RAM, ROM, cache, fiber optics, EPROM/Flash memory, CD/DVD/BD-ROM, hard disk drives, solid-state storage, optical or magnetic storage devices, diskettes, electrical connections having a wire, any system or device that is of a magnetic, optical, semiconductor, or electronic type, or any combination thereof.

The interface device 180 can include one or more displays and/or output devices 304 such as monitors, speakers, headphones, projectors, wearable-displays, holographic displays, and/or printers, for example. An output device 304 may be any device capable of providing tactile feedback to a user, and may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). In some embodiments, one or more output devices 304 may constitute an interface component.

The interface device 180 may further include one or more input devices 306, which can include, by way of example, any type of mouse, keyboard, disk/media drive, memory stick/thumb-drive, memory card, pen, joystick, gamepad, touch-input device, biometric scanner, voice/auditory input device, motion-detector, camera, scale, etc. In some embodiments, one or more input devices 306 may constitute a control device.

A network interface 312 can facilitate communications over a network 314 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The interface device 180 may include one or more network interfaces 312 to facilitate communication with one or more remote devices, which may include, for example, client and/or server devices. A network interface 312 may also be described as a communications module, as these terms may be used interchangeably. Network interface 312 can be communicatively coupled to any device capable of transmitting and/or receiving data via one or more networks 170, which may correspond to the network 170 in FIG. 1. In other embodiments different networks may be accessed to facility connectivity, such that network 170 need not be or even be in direct communication with the network 170 in FIG. 1, such as where one or more other networks may serve as intermediary networks. The network interface hardware 312 can include a communication transceiver for sending and/or receiving any wired or wireless communication.

For example, the network interface hardware 312 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 316 may comprise a plurality of computer readable mediums, each of which may be either a computer readable storage medium or a computer readable signal medium. A computer readable medium 316 may reside, for example, within an input device 306, non-volatile memory 308, volatile memory 310, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media exclude propagated signals and carrier waves.

Figure 4:
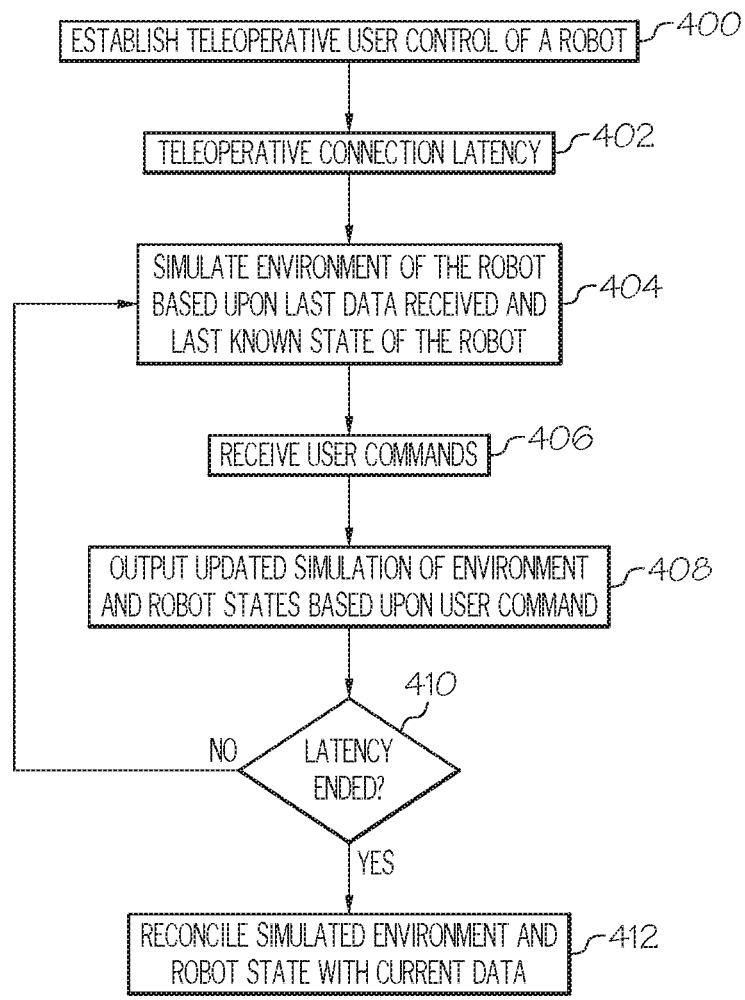
FIG. 4 illustrates a flowchart for updating a predicted version of the teleoperative environment based upon user input received during latency, according to one or more embodiments described and illustrated herein.

Turning to FIG. 4, a flowchart for updating a predicted version of the teleoperative environment during latency based upon user input received is presented, according to one embodiment. At block 400, a teleoperative user's control of a robot may be established, such as through an input device and/or a control device (e.g. the interface device 180), along with an interface that may provide a virtual representation of an environment of a robot (e.g., a virtual representation displayed on a display of the one or more output devices of the interface device 180). In this embodiment, the virtual representation is a point cloud representation produced by one or more lidar sensors utilized by the robot. In other embodiments, any suitable type of data and/or sensor(s) (such as the proximity sensor 154 discussed above) may be utilized to obtain and produce a representation of the environment of the robot, which may be referred to as a virtual representation. A robot may move within the environment and/or manipulate objects within the environment. An object may be anything with which a robot is capable of observing and/or physically interacting.

At block 402, latency may be encountered in the teleoperative connection between the user and the robot. In this embodiment, latency may be any disruption in the continuity of a real-time or substantially real-time teleoperative connection. Latency may be, by way of non-limiting example, one or more instances of anything causing a loss and/or reduction of connectivity anywhere between the robot and the user. Latency may include delayed delivery or undelivered user input to the robot. Latency may also include delayed or undelivered responses received from the robot and/or the robot's environment. For example, the user may experience latency as a delay (which can have any possible duration) or non-responsiveness of the robot in response to the user's inputs. Latency may also include the user experiencing a loss of feedback (visual, audio, tactile, and the like) and/or feedback that is delayed, frozen/perpetual, jittery, stuttering, of lower fidelity/resolution/bitrate, intermittent, or anything else symptomatic of anything interfering with the continuity of a real-time or substantially real-time teleoperative connection. Latency may be due to interference, poor connections, congestion, malfunctioning or underperforming hardware/software/firmware/codecs, or anything else that can inhibit the flow of information between a robot and its teleoperative user. There may be more than one period of latency encountered, where the length of at least some of the latency periods may differ from each other.

At block 404, the environment of the robot may be rendered as a predicted version based upon the last data received from the robot, the last data received from the user, and/or the last known state of the robot. For example, the user may be controlling the robot to move forward when latency is encountered. If the user is merely presented with the last available image, the result can be disjointed and/or jarring to the user. Upon termination of the latency, the user's interface may unfreeze and resume with the robot's current view, which could be completely different from the frozen view. This in turn can disorient the user and/or inhibit their ability to resume proper/adequate/complete control of the robot at the conclusion of the latency.

At block 406, user input may be received during the latency. The input may be, by way of non-limiting example, user input to modify the state of the robot. Such user input may direct a change in the robot's location, whether the robot was already moving or stationary at the start of the latency. The user input may also involve the robot interacting with its environment, as discussed in more detail below with respect to FIGS. 8A-8C, such as with objects in the environment.

At block 408, continuing during the latency, an updated predicted version of the virtual representation of the robot's environment may be produced for the user in a way that is responsive to the user's post-latency input. For example, as discussed in more detail below with respect to FIGS. 7A-7C, the robot may have already been moving forward when the latency was encountered. Rather than be presented with a frozen image, for example, the user may instead be presented with a predicted version view of the robot continuing to move forward in the environment as the user continues to provide input to move the robot forward. The output provided to the user may include haptic and/or audio feedback in the predicted version of the environment, such as with the output device 304 discussed above. For example, if the robot was heading in the direction of a device emitting a noise, the predicted version environment may continue producing the noise (or an approximation), and may increase the volume of the noise in the simulation based upon the robot getting closer to the device. In another example, where latency is encountered as a robot approaches a wooden bridge, haptic feedback may be provided in the form of rumbling during the simulation to represent the wooden bridge being encountered during the simulation.

At block 410, a determination may be made as to whether the latency has ended. If the latency has not ended, then the flowchart returns back to block 404 to continue simulating the environment of the robot based upon the last data received from the robot and the last known state of the robot. Otherwise, if the latency has ended, then at block 412 the predicted version of the environment and robot state are reconciled with current data. Reconciliation may be performed in any manner that reverts the user's predicted version of the interface back to the current virtual view as received from the robot. In this embodiment, to maintain such cohesion, any suitable graphic technique may be utilized to smooth the transition back from the predicted version of the view, such as blending, fading, morphing, and the like. In another embodiment, the reconciliation may be a direct cut from the simulation back to the current virtual view from the robot. In other embodiments, a notification (visual, audio, tactile, and the like) may be provided by the user to indicate that the view is reverting back from the simulation to the current view. Although not depicted in this embodiment, it should also be noted that additional latency periods can occur later during teleoperation of the robot, in which case the flowchart could return to block 402.

Figure 5:
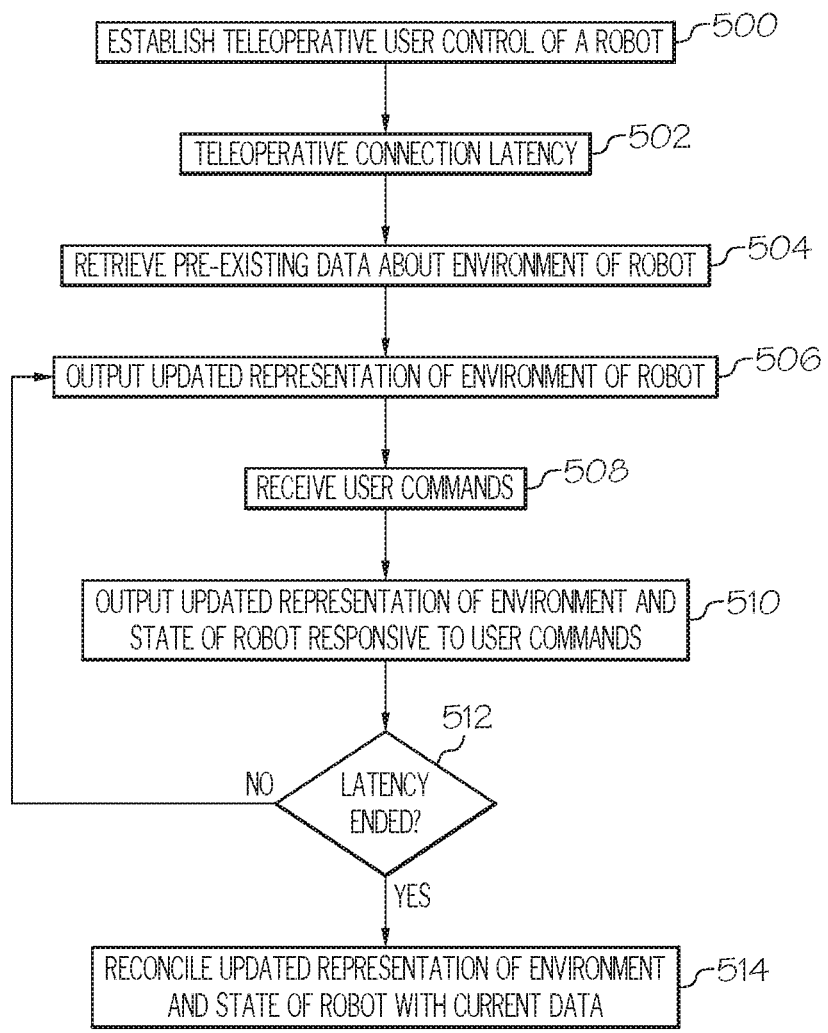
FIG. 5 illustrates a flowchart for updating a predicted version of the teleoperative environment based upon preexisting data in response to user input received during latency, according to one or more embodiments described and illustrated herein.

Turning to FIG. 5, a flowchart for updating a predicted version of the teleoperative environment based upon preexisting data and user input received during latency is presented, according to one embodiment. At block 500, the teleoperative user's control of the robot may be established along with an interface that may provide a virtual representation of the environment of the robot. At block 502, latency is encountered in the teleoperative connection between the user and the robot. At block 504, pre-existing data pertaining to the robot's environment may be retrieved during the latency. In some embodiments, the retrieval may be automatically triggered once latency is encountered. In other embodiments, a cached version of the predicted version of the environment may be pre-loaded. In some embodiments, various data relating to the simulation may be retrieved or swapped-out based upon the current location and/or state of the robot. In some embodiments, the user may be prompted or may otherwise manually retrieve and/or utilize pre-existing data to generate the simulation, such as when latency is encountered. In some embodiments, data retrieval and/or user prompting may be initiated based upon one or more connectivity thresholds between the robot and the user.

At block 506, a predicted representation (i.e., a simulation) of the robot's environment may be rendered to the user. Pre-existing data may be presented as one or more three-dimensional models of various aspects of the environment, such as rooms, walls, furniture, and the like. Pre-existing data may include two-dimensional data to provide a perspective (overhead, first-person, side-view, or any other perspective) of where the robot is currently located within the environment and/or of the robot's current state (robot movements, interactions, and the like). For example, a three-dimensional model of the environment may be presented to approximate what was last seen by the user once the latency began. Such a three dimensional model may be a simplified version of the environment, such as where more prominent features (walls, large furniture, doorways, stairs) are provided without regard to other features (objects that are smaller, more portable, etc.). Any suitable level of detail may be utilized. In another example, a stored two dimensional image may be presented. One or more two-dimensional images representative of the robot's point of view in the environment may be utilized to approximate the environment. A view of the robot may be provided in the simulation, such as one or more robot arms 155 and/or effectuators 157 from a first-person view. A remote view of the robot may be presented as a two or three dimensional representation. The user may be provided a top view, a side view, and/or any other suitable view of the robot.

At block 508, user commands may be received from the user during the latency. User input/commands may be include anything that the robot would be capable of performing in the absence of the latency, including by way of non-limiting example to forward, reverse, and/or lateral movement, rotation, increasing/decreasing the robot's height, and/or utilizing anything the robot would use for manipulating objects (such as the interaction effectuator 157 depicted above with respect to FIG. 2). In some embodiments, more than one command may be received such that the simulation may perform both commands. As discussed in more detail below with respect to FIGS. 7A-C, a robot may manipulate an object (such as lower a coffee cup onto a table). This could be performed in the simulation while the user also pans the robot's viewpoint to the left in the simulation.

At block 510, the predicted version of the representation is updated based upon the user commands. For example, where the predicted version of the representation utilizes at least one two dimensional image, the image would zoom in to correspond to the user's command to move the robot forward and correspondingly zoom out to correspond to the user's command to move the robot backward. User commands can have the robot look around (up, down, left right) may pan in the corresponding direction within an image (if there are additional portions available to support such panning) or import/utilize another image. A two-dimensional view of the robot may be presented, such that the two-dimensional version of the robot and its pose may be updated based upon a change in viewpoint and/or a change in the pose of the robot. In another example, a three dimensional model of the environment and/or the robot may be utilized. Any suitable degree of detail in such three dimensional models may be utilized. For example, a three dimensional model of the environment may utilize substantial features (such as walls, doors, large furniture) but not more transient features (such as small objects, people, temporarily-placed objects).

At block 512, a determination may be made as to whether the latency has ended. If the latency has not ended, then the flowchart returns back to block 506 to continue simulating the environment of the robot based upon the received user commands, the last data received from the robot, and the last known state of the robot. Otherwise, if the latency has ended, then at block 514 the predicted version of the environment and robot state may be reconciled with current data. Reconciliation may be performed in any manner that reverts the user's interface back to the current virtual view available from the robot.

Figure 6:
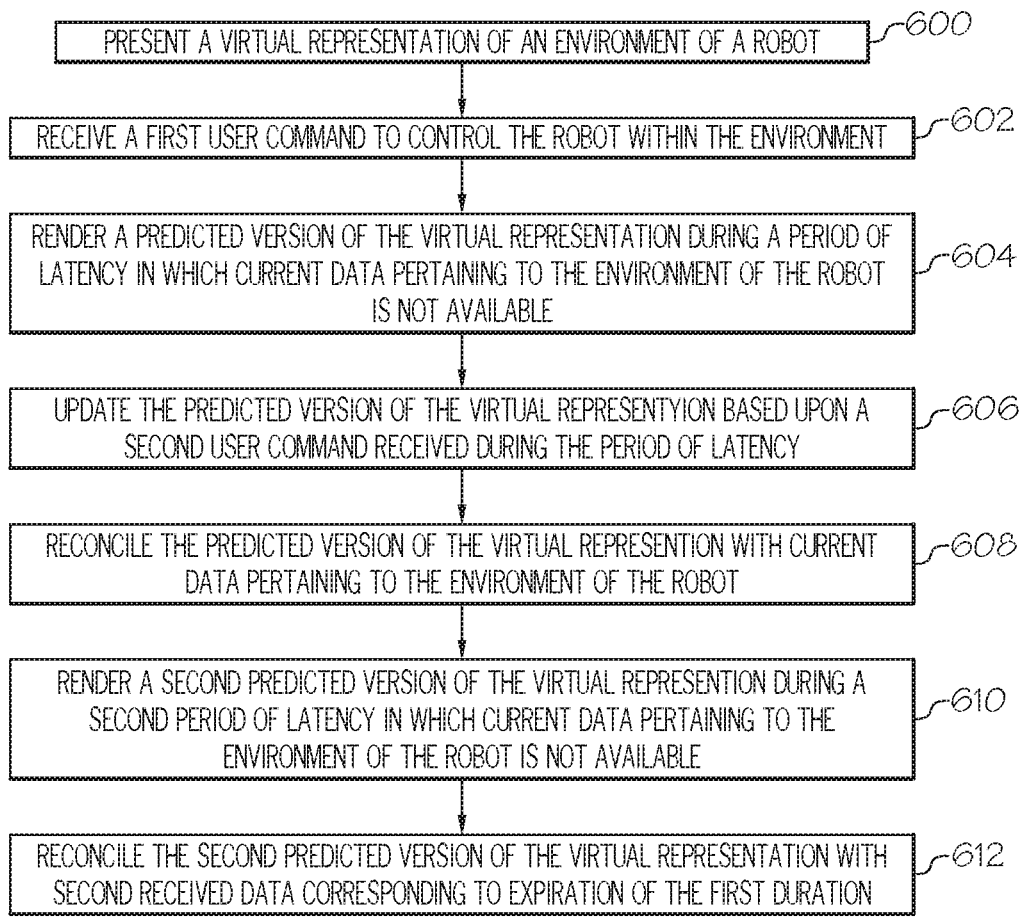
FIG. 6 illustrates a flowchart for updating a predicted version of the teleoperative environment based upon multiple user inputs received during latency, according to one or more embodiments described and illustrated herein.

Turning to FIG. 6, a flowchart for updating a predicted version of the teleoperative environment based upon multiple user inputs received during latency is presented. At block 600, a virtual representation of an environment of a robot may be presented to the user in a graphical interface. At block 602, a first user command may be received to control the robot within the environment, such as instructing the robot to approach a glass seated upon a table. At block 604, a predicted version of the virtual representation may be rendered during a period of latency in which current data pertaining to the environment of the robot is not available. For example, the interface may zoom in upon a two-dimensional image as the user still instructs the robot to continue proceeding towards the glass. At block 606, the predicted version of the virtual representation may be updated based upon a second user command received during the period of latency. For example, the user may direct the robot to look to the right and back again. At block 608, the predicted version of the virtual representation may be reconciled with current data pertaining to the environment of the robot. At block 610, a second predicted version of the virtual representation may be rendered during a second period of latency in which current data pertaining to the environment of the robot is not available. At block 612, the second predicted version of the virtual representation may be reconciled with second received data corresponding to expiration of the first duration.

Figure 7A:
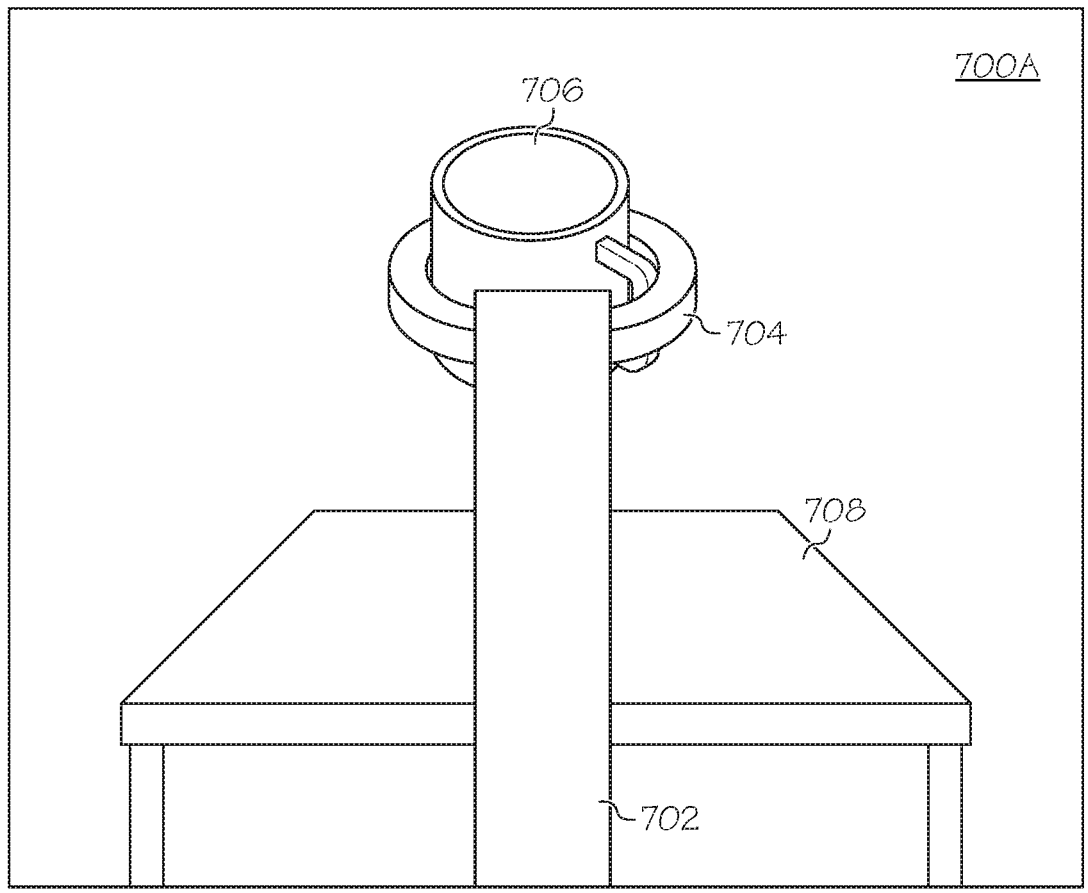
FIG. 7A illustrates a teleoperative first-person view from a robot manipulating an object, according to one or more embodiments shown and described herein.

Turning to FIG. 7A, a teleoperative first-person view from a robot 100 illustrates a virtual representation of an environment 700A of a robot effectuator 704 manipulating an object 706. The virtual representation may be displayed on a display device of the interface device 180. In this embodiment, the effectuator 704, being located at the distal end of a robot arm 702, holds an object 706 above a table 708. Although depicted as a pincer, an effectuator 704 may be anything (such as a hand, claw, flat/pointed/curved surface, blade, tentacle, rod, an appendage and the like) associated with the robot 100 that is capable of interacting with an object 706. Although depicted as a coffee cup, an object 706 may be anything with which a robot 100 can interact. Here, the user teleoperatively controls the robot arm 702 and effectuator 704 to lower the object 706 towards the table 708.

Figure 7B:
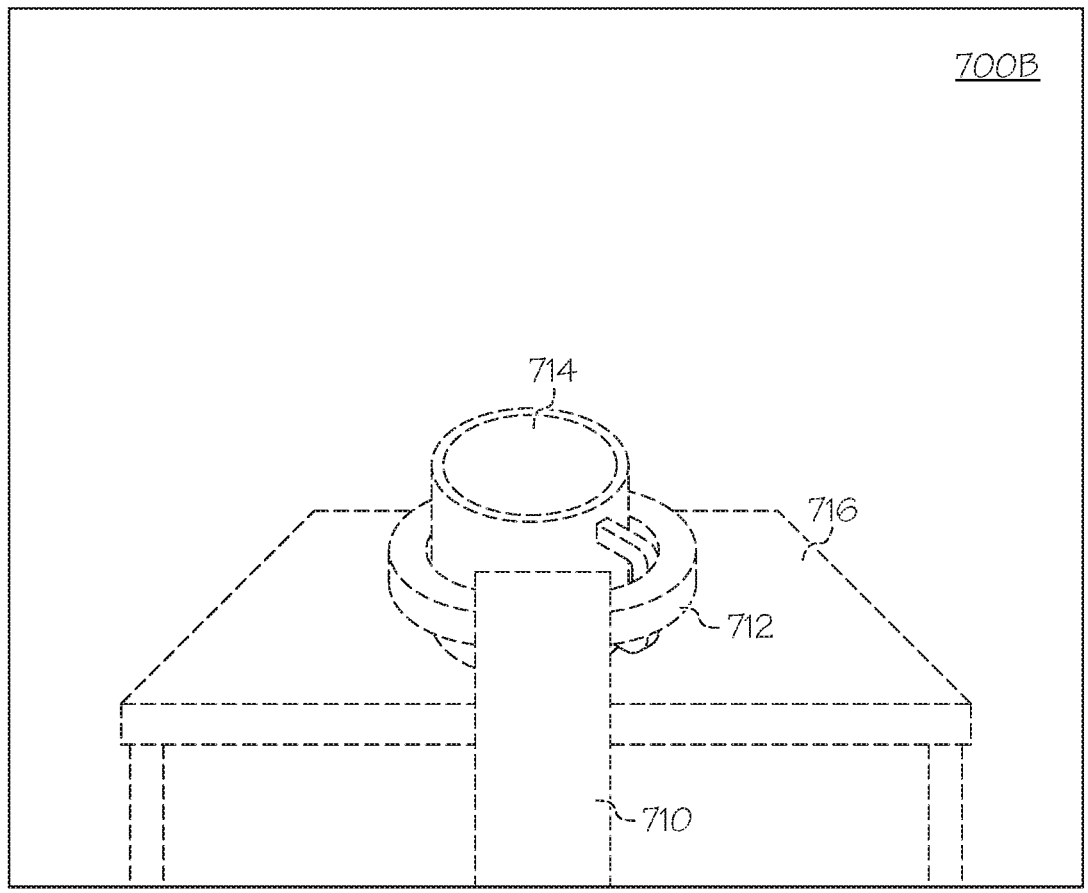
FIG. 7B illustrates a subsequently predicted version of the teleoperative first-person view from the robot during latency as the robot completes manipulation of the object depicted in FIG. 7A, according to one or more embodiments shown and described herein.

Turning to FIG. 7B, a teleoperative first-person view from a robot 100 illustrates a representation during latency of a predicted version of the environment 700B of the robot completing its manipulation of the object depicted in FIG. 7A. Merely for illustrative purposes, predicted versions of the images are depicted herein by dashed lines. Here, a predicted version of the arm 710 having a predicted effectuator 712 moves a predicted version of the object 714 down onto a predicted version of the table 716, where the predicted version of the object 714 corresponds to the object 706 and the predicted version of the table 716 corresponds to the table 708 depicted in FIG. 7A. In this example, the downward movement of the object 706 in FIG. 7A (prior to the latency) has been propagated into the predicted version of the environment 700B such that the robot continues with the command from the user as-issued when the latency occurred. Here the command was for the robot 100 to lower the object 706 onto the table 708. Once the latency occurs, the predicted version of the object 714 continues to be lowered at the same rate as was occurring at the time of the latency beginning. In other examples, the robot 100 may slow or cease movement and/or manipulation during latency.

Figure 7C:
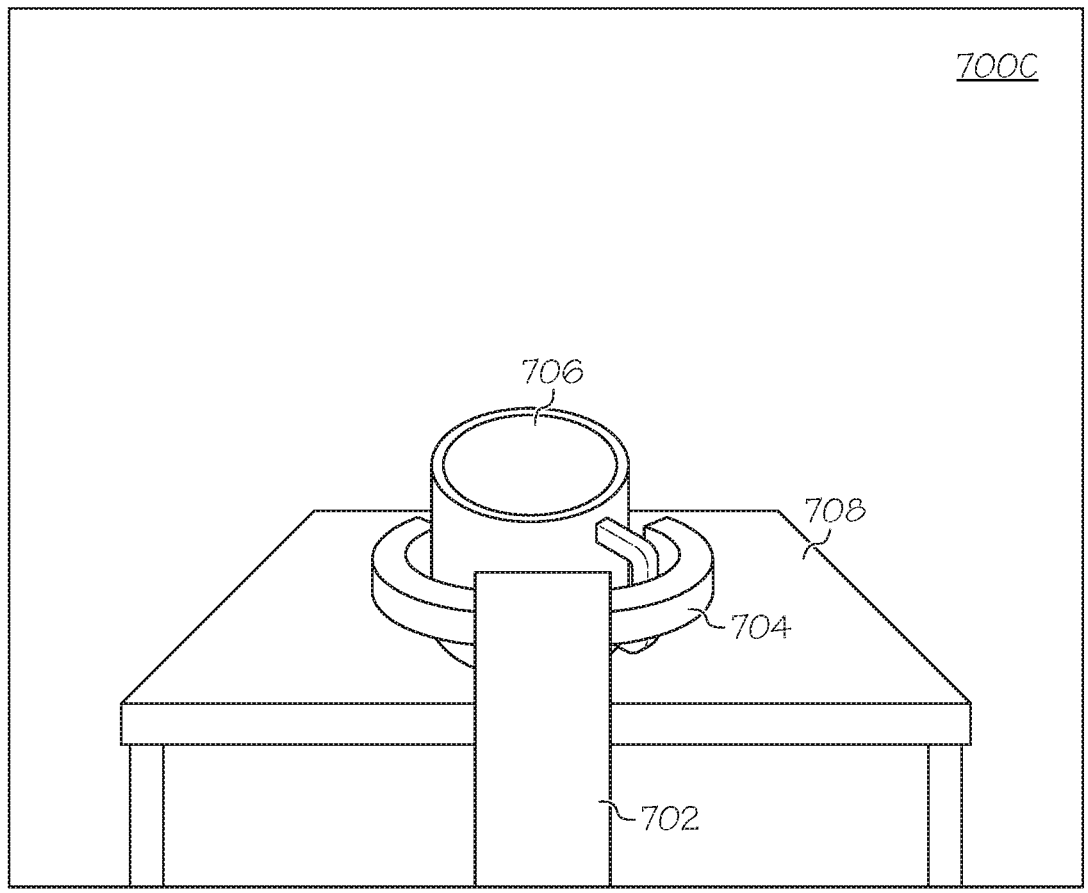
FIG. 7C illustrates a current virtual teleoperative first-person view from the robot now reconciled with the predicted version of the version depicted in FIG. 7B after the latency, according to one or more embodiments shown and described herein.

Turning to FIG. 7C, a first-person view from the robot illustrates a current virtual teleoperative first-person view from the robot reconciled with the predicted version of the version depicted in FIG. 7B after the latency. In this embodiment the object 706 was lowered onto the table 708 during the latency. Although the actual lowering of the object 706 onto the table 708 was not visible to the user during the latency, the current view depicted here in FIG. 7C is generally consistent with the predicted version of the view in FIG. 7B. In this way, the continuity of the user controlling the robot and observing the robot has been preserved and not significantly disrupted by the latency.

Figure 8A:
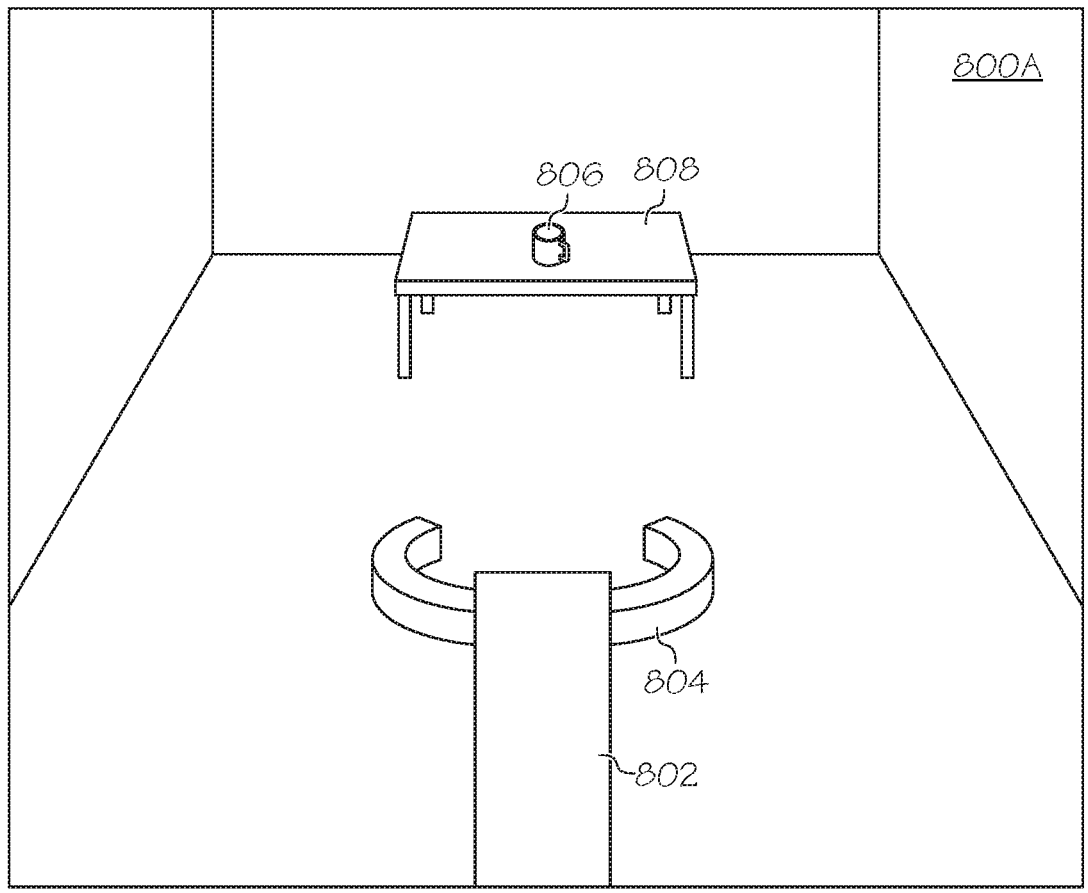
FIG. 8A illustrates a teleoperative first-person view from a robot approaching an object, according to one or more embodiments described and illustrated herein.

Turning to FIG. 8A, a first-person view illustrates a virtual representation of an environment 800A of a robot approaching an object. A teleoperative first-person view from a robot 100 illustrates a virtual representation of an environment 800A depicting a robot arm 802 with a robot effectuator 804 approaching an object 806 sitting upon a table 808. Here the user teleoperatively controls the robot 100 to approach the object 806 towards the table 808.

Figure 8B:
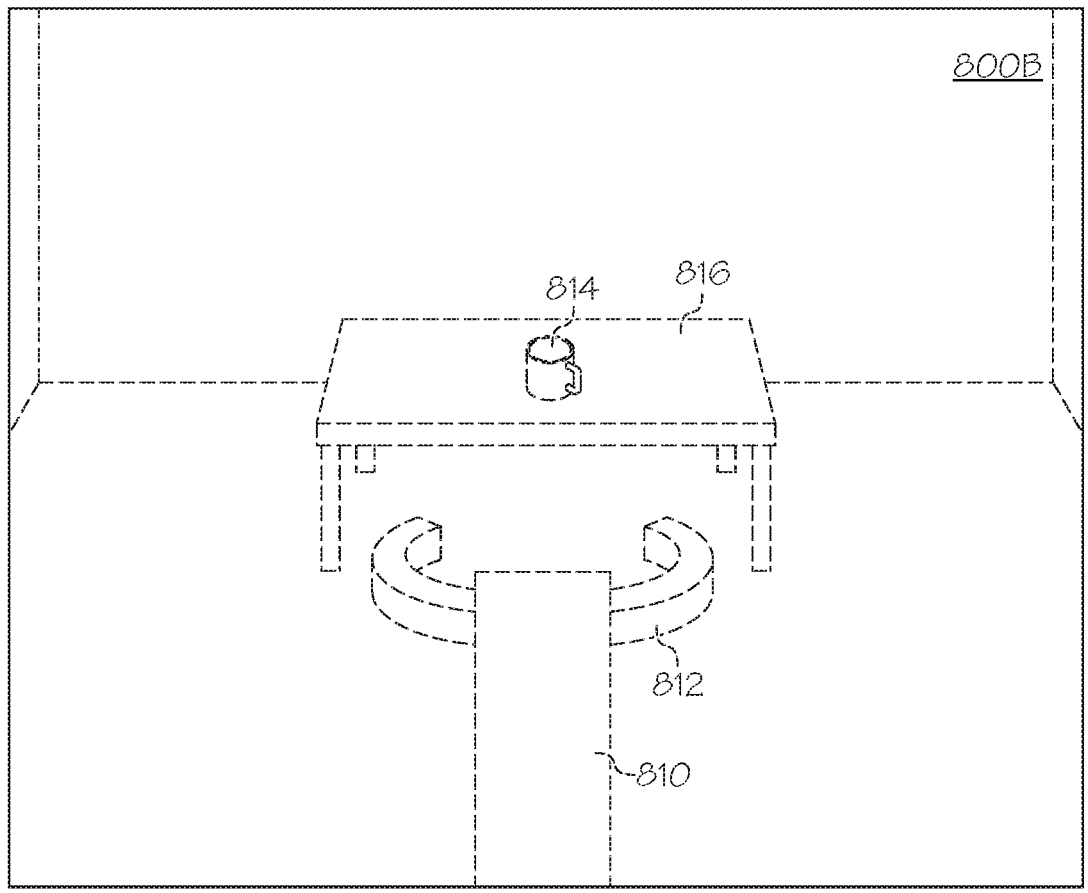
FIG. 8B illustrates during latency a subsequently predicted version of the teleoperative first-person view from the robot continuing to approach the object depicted in FIG. 8A, according to one or more embodiments described and illustrated herein.

Turning to FIG. 8B, a teleoperative first-person view of a predicted version of the environment 800B during latency is presented of the robot continuing to approach the object subsequent to the depiction in FIG. 8A. During latency, the robot (as represented by the predicted version of the arm 810 having a predicted version of the effectuator 812) moves forward towards the predicted version of the object 814 sitting upon the predicted version of the table 816, based upon the user having issued a command for the robot to proceed forward.

Figure 8C:
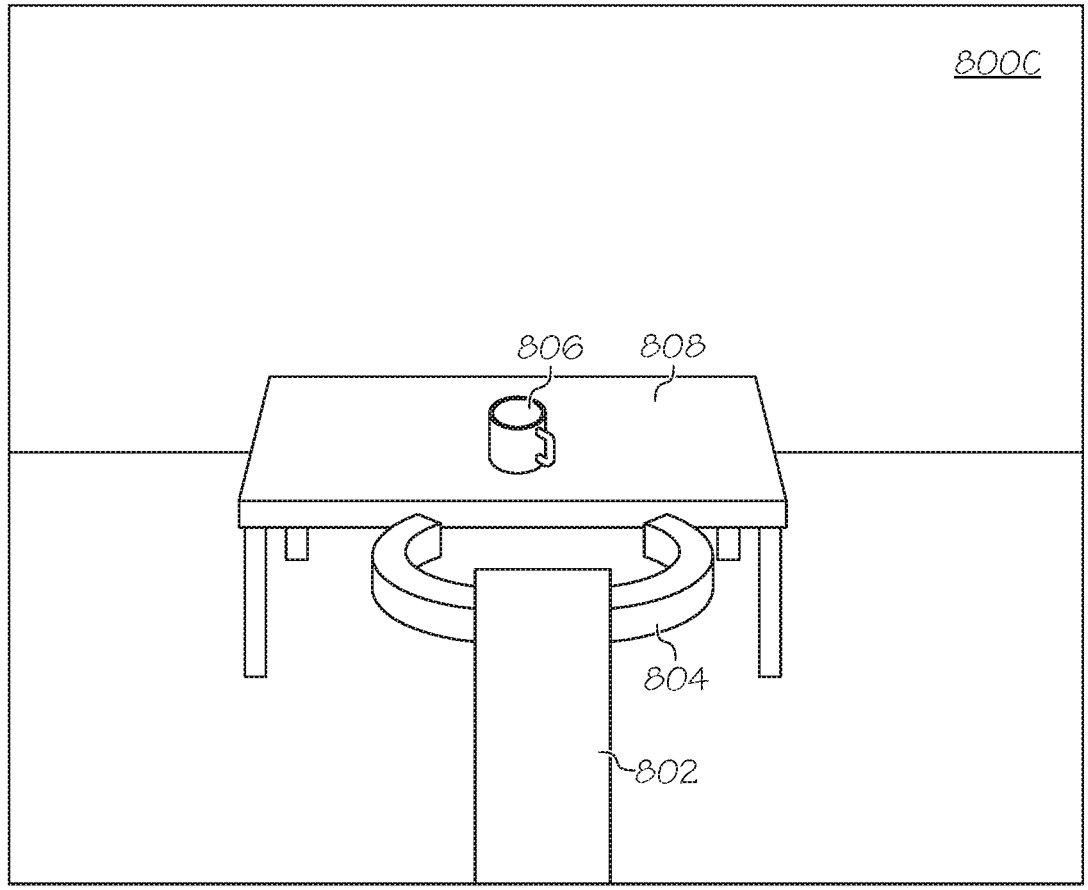
FIG. 8C illustrates a current virtual teleoperative first-person view from the robot reconciled with the predicted version of the version depicted in FIG. 8B after the latency, according to one or more embodiments described and illustrated herein.

Turning to FIG. 8C, a first-person view from the robot illustrates a virtual representation of the environment 800C having been reconciled with the predicted version depicted in FIG. 8B after the latency. Here the current view is generally consistent with the predicted version of the view in FIG. 8B. Specifically, the relative position of the object 806 sitting upon the table 808 in the current environment 800C after the latency is generally consistent with the positioning of the predicted version of the object 814 sitting upon the predicted version of the table 816 in FIG. 6B when the latency ceased.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   presenting a virtual representation of an environment of a robot;
   receiving a first user command to control the robot within the environment;
   rendering a predicted version of the virtual representation during a period of latency in which current data pertaining to the environment of the robot is not available;
   updating the predicted version of the virtual representation based upon a second user command received during the period of latency, wherein the second user command relates to directing the robot to manipulate an object in the environment of the robot;
   receiving, during the period of latency, a third user command to complete interaction of the robot with the object in the environment;
   simulating completion of the interaction of the robot with the object; and
   upon conclusion of the period of latency, reconciling (i) the predicted version of the virtual representation with current data pertaining to the environment of the robot and (ii) the predicted version of the object now disengaged from the robot with current data about the object.

2. The method of claim 1 further comprising providing haptic feedback based upon a predicted state of the robot within the predicted version of the virtual representation during the period of latency for which the current data is not available.

3. The method of claim 1 further comprising providing audio feedback based upon a predicted state of the robot within the predicted version of the virtual representation during the period of latency for which the current data is not available.

4. The method of claim 1 wherein the second user command to control the robot is not related to the motility of the robot and differs from the first user command.

5. The method of claim 1 wherein the predicted version of the virtual representation is rendered during the period of latency utilizing preexisting data pertaining to the environment of the robot.

6. The method of claim 1 wherein the period of latency is a first period of latency having a duration that differs from a second duration of a second period of latency.

7. A method comprising:
   presenting a virtual representation of an environment of a robot;
   receiving a first user command to control the robot within the environment;
   rendering a first predicted version of the virtual representation during a first period of latency in which current data pertaining to the environment of the robot is not available, wherein the first period of latency has a duration that differs from a second duration of a second period of latency, wherein the first predicted version of the virtual representation is reconciled with the current data at the expiration of the first duration;
   rendering a second predicted version of the virtual representation during the second period of latency in which current data pertaining to the environment of the robot is not available;
   updating the first predicted version of the virtual representation based upon a second user command received during the first period of latency;
   upon conclusion of the first period of latency, reconciling the first predicted version of the virtual representation with current data pertaining to the environment of the robot; and
   subsequent to the reconciliation of the first predicted version at the expiration of the first duration, reconciling the second predicted version of the virtual representation with second received data corresponding to expiration of the first duration.

8. The method of claim 1 further comprising reconciling the predicted version of the virtual representation based upon the current data and data corresponding to the latency period pertaining to the environment of the robot.

9. An interface device comprising:
   memory; and
   a processor coupled to the memory, the processor being configured to:
      present a virtual representation of an environment of a robot;
      receive a first user command to control the robot within the environment;
      render a predicted version of the virtual representation during a period of latency in which current data pertaining to the environment of the robot is not available;
      update the predicted version of the virtual representation based upon a second user command received during the period of latency;
      receive, during the period of latency, a third user command to complete interaction of the robot with the object in the environment;
      simulate completion of the interaction of the robot with the object; and
      upon conclusion of the period of latency, reconcile (i) the predicted version of the virtual representation with current data pertaining to the environment of the robot and (ii) the predicted version of the object now disengaged from the robot with current data about the object.

10. The system of claim 9 wherein the processor is further configured to provide haptic feedback based upon a predicted state of the robot within the predicted version of the virtual representation during the period of latency for which the current data is not available.

11. The system of claim 9 wherein the processor is further configured to provide audio feedback based upon a predicted state of the robot within the predicted version of the virtual representation during the period of latency for which the current data is not available.

12. The system of claim 9 wherein the second user command relates to directing the robot to manipulate an object in the environment of the robot.

13. The system of claim 9 wherein the second user command to control the robot is not related to the motility of the robot and differs from the first user command.

14. The system of claim 9 wherein the processor is further configured to render the predicted version of the virtual representation during the period of latency utilizing preexisting data pertaining to the environment of the robot.

15. The system of claim 9 wherein the period of latency is a first period of latency having a duration that differs from a second duration of a second period of latency.

16. The system of claim 9 wherein the predicted version of the virtual representation is a first predicted version of the virtual representation reconciled with the current data at the expiration of the first duration, the system being further configured to:

render a second predicted version of the virtual representation during the second period of latency in which current data pertaining to the environment of the robot is not available;

subsequent to the reconciliation of the first predicted version at the expiration of the first duration, reconcile a second predicted version of the virtual representation with second received data corresponding to expiration of the first duration.

17. The system of claim 9 wherein the processor is further configured to reconcile the predicted version of the virtual representation based upon the current data and data corresponding to the latency period pertaining to the environment of the robot.

* * * * *